(12) United States Patent
Cho et al.

(10) Patent No.: US 12,549,878 B2
(45) Date of Patent: Feb. 10, 2026

(54) ELECTRONIC DEVICE INCLUDING SPEAKER

(71) Applicant: Samsung Electronics Co., Ltd., Suwon-si (KR)

(72) Inventors: Joonrae Cho, Suwon-si (KR); Kiwon Kim, Suwon-si (KR); Jihoon Song, Suwon-si (KR); Myoungsung Sim, Suwon-si (KR); Hunki Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 383 days.

(21) Appl. No.: 18/188,810

(22) Filed: Mar. 23, 2023

(65) Prior Publication Data

US 2023/0232141 A1    Jul. 20, 2023

Related U.S. Application Data

(63) Continuation of application No. PCT/KR2022/017183, filed on Nov. 4, 2022.

(30) Foreign Application Priority Data

Nov. 17, 2021  (KR) .................. 10-2021-0158765
Dec. 30, 2021  (KR) .................. 10-2021-0192966

(51) Int. Cl.
*H04R 1/02* (2006.01)
*H04R 1/28* (2006.01)
*H05K 5/04* (2006.01)

(52) U.S. Cl.
CPC ............. *H04R 1/025* (2013.01); *H04R 1/288* (2013.01); *H05K 5/04* (2013.01)

(58) Field of Classification Search
CPC .......... H04R 1/025; H04R 1/288; H05K 5/04
USPC ......................................................... 381/395
See application file for complete search history.

(56) References Cited

U.S. PATENT DOCUMENTS

| | | | |
|---|---|---|---|
| 8,705,790 | B2 | 4/2014 | Kuze |
| 9,838,765 | B1 | 12/2017 | Li et al. |
| 2012/0237076 | A1 | 9/2012 | Kuze |
| 2013/0094685 | A1 | 4/2013 | Seo et al. |
| 2018/0279029 | A1 | 9/2018 | Saini et al. |

(Continued)

FOREIGN PATENT DOCUMENTS

| | | |
|---|---|---|
| CN | 212628375 U | 2/2021 |
| CN | 213462310 U | 6/2021 |
| JP | H11-018182 A | 1/1999 |

(Continued)

OTHER PUBLICATIONS

International Search Report dated Feb. 9, 2023, issued in International Patent Application No. PCT/KR2022/017183.

(Continued)

*Primary Examiner* — Sean H Nguyen
(74) *Attorney, Agent, or Firm* — Jefferson IP Law, LLP

(57) ABSTRACT

An electronic device including a speaker is provided. The electronic device includes a main housing, a cover housing connected to the main housing, a speaker provided inside the main housing and the cover housing, and a guide including a guide base seated on the main housing to support the speaker and a guide body extending from the guide base in a first direction and overlapping the speaker in a second direction perpendicular to the first direction.

21 Claims, 14 Drawing Sheets

(56) References Cited

U.S. PATENT DOCUMENTS

2021/0120343 A1    4/2021  Zhang et al.

FOREIGN PATENT DOCUMENTS

| | | |
|---|---|---|
| JP | 2000-278794 A | 10/2000 |
| JP | 3783343 B2 | 6/2006 |
| JP | 4127443 B2 | 7/2008 |
| JP | 2010-119032 A | 5/2010 |
| KR | 10-2003-0012589 A | 2/2003 |
| KR | 10-2011-0080597 A | 7/2011 |
| KR | 10-1468631 B1 | 12/2014 |
| KR | 10-1876804 B1 | 7/2018 |
| WO | 2021/164015 A1 | 8/2021 |

OTHER PUBLICATIONS

Extended European Search Report dated on Dec. 6, 2024, issued in European Application No. 22895920.1.

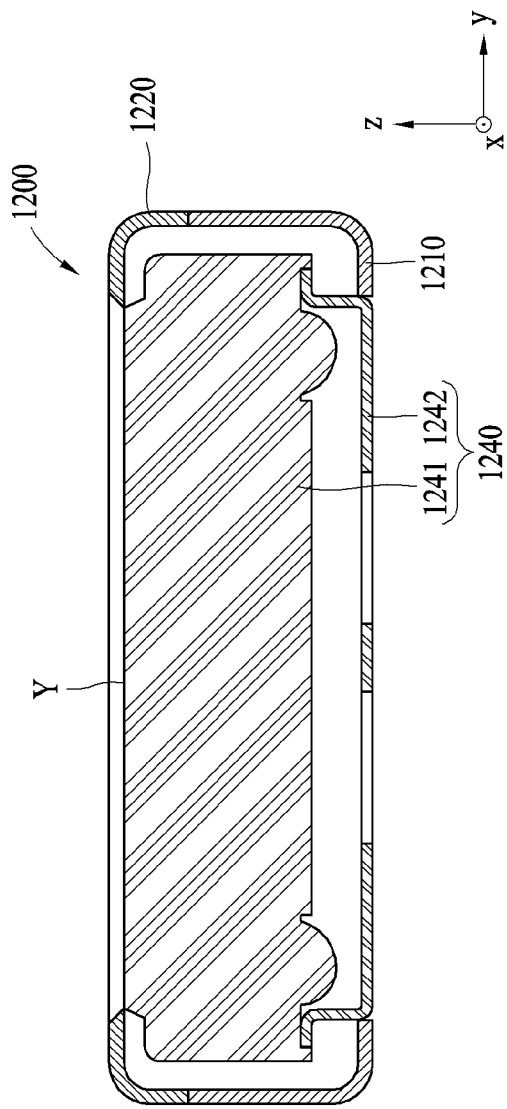
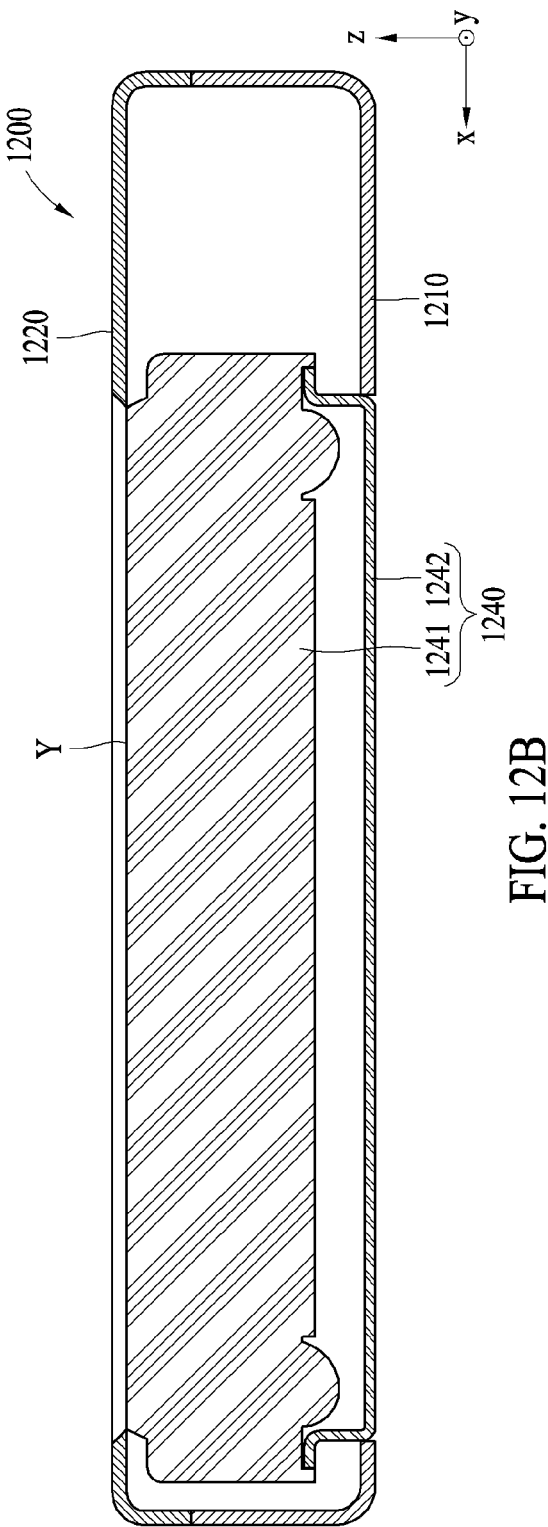
FIG. 12A
FIG. 12B

ELECTRONIC DEVICE INCLUDING SPEAKER

CROSS-REFERENCE TO RELATED APPLICATION(S)

This application is a continuation application, claiming priority under § 365(c), of an International application No. PCT/KR2022/017183, filed on Nov. 4, 2022, which is based on and claims the benefit of a Korean patent application number 10-2021-0158765, filed on Nov. 17, 2021, in the Korean Intellectual Property Office, and of a Korean patent application number 10-2021-0192966, filed on Dec. 30, 2021, in the Korean Intellectual Property Office, the disclosure of each of which is incorporated by reference herein in its entirety.

BACKGROUND

1. Field

The disclosure relates to an electronic device including a speaker. More particularly, the disclosure relates to an electronic device including a speaker and a method of improving the mountability of a speaker and provide technology for securing sufficient rear space by considering possible restrictions when a housing is made of a stainless-steel material.

2. Description of Related Art

A speaker that converts electrical energy into mechanical energy and/or acoustic energy may reproduce sound in a manner that generates a longitudinal wave of air through a vertical movement of a diaphragm. The front and rear surfaces of the diaphragm generate sounds having phases opposite to each other. The front and rear spaces of the diaphragm may have to be separated from each other to prevent destructive interference of the sounds generated from the front and rear surfaces. To prevent a phenomenon in which a sound having a phase opposite to that of the sound generated from the front surface of the diaphragm leaks to the outside, the rear space of the diaphragm may be designed in a closed structure.

The above information is presented as background information only to assist with an understanding of the disclosure. No determination has been made, and no assertion is made, as to whether any of the above might be applicable as prior art with regard to the disclosure.

SUMMARY

As electronic devices are being miniaturized, speaker mounting portions provided inside electronic devices are also being miniaturized. There may be a need to have sufficient space at the rear of the diaphragm within a limited space.

To prevent forwardly transmitted sound and rearwardly transmitted sound from mixing, a space in which the rearwardly transmitted sound is generated may be designed in a closed structure, referring to a diaphragm of the speaker of a small electronic device. The size of a housing enclosing the speaker as well as the size of the speaker may need to be considered to design a space of a dynamic speaker for rearwardly transmitted sound in a closed structure. The size of the housing accommodating the speaker may also need to be reduced enough that the housing may be inserted into the small electronic device.

The housing accommodating the speaker is made of an injected object with a high degree of freedom in shape implementation. The injected object may need to be thick enough that it may be molded, and accordingly, the size of the housing may need to be increased to match the thickness of the housing. The housing of the speaker may be made of a metallic stainless-steel material. However, using such material may make it difficult to implement a relatively complex shape, may be disadvantageous as far as space optimization, or may limit the extent to which the size of the exterior may be reduced. Since the movement of the diaphragm of a speaker is limited, when the rear space is limited in size, low frequency band performance may be limited. There may be a desire to use a closed housing structure with a large internal space to improve the sound of the speaker.

Sometimes, it may be necessary to apply a housing made of a relatively thin stainless-steel material to be able to effectively mount the speaker in the limited space and to improve the performance of the speaker. With the housing made of a stainless-steel material, which accommodates the speaker, it may not be easy to implement a desired and/or complex shape. When the housing made of a stainless-steel material is implemented by a press-working method, springback may occur, or a desired shape may not be achieved.

The speaker mounted on a planar portion may not be effectively fixed. For example, the speaker may unintentionally move in a direction parallel to the planar portion. A technique for fixing the speaker by deforming a portion of the housing made of a stainless-steel material may be considered. But, using a stainless-steel material, a desired and/or complex shape may not be readily implemented, or the size of the housing may need to be increased unintentionally, since a stainless-steel material is difficult to deform, due to its nature.

To be able to mount a speaker inside a housing made of a stainless-steel material, the housing size may need to be large enough to enclose the speaker. Connecting the housing to a protective plate of the speaker may be an option, but using this technique may reduce the rear space of the speaker because the front area of the protective plate may not be used as the rear space of the speaker.

Removing the protective plate and directly attaching the housing to the speaker e may also be an option, but using this technique may not allow sufficient space between the housing and the diaphragm of the speaker for the diaphragm to vibrate. In addition, a mesh may not be readily attached to the housing.

Aspects of the disclosure are to address at least the above-mentioned problems and/or disadvantages and to provide at least the advantages described below. Accordingly, another aspect of the disclosure is to improve the mountability of a speaker and provide technology for securing sufficient rear space by considering possible restrictions when a housing is made of a stainless-steel material.

Additional aspects will be set forth in part in the description which follows and, in part, will be apparent from the description, or may be learned by practice of the presented embodiments.

In accordance with an aspect of the disclosure, an electronic device including a speaker is provided. The electronic device includes a main housing. The electronic device may include a cover housing connected to the main housing. The electronic device may include a speaker provided inside the main housing and the cover housing. The electronic device may include a guide including a guide base seated on the main housing to support the speaker and a guide body extending from the guide base in a first direction and overlapping the speaker in a second direction perpendicular to the first direction.

In accordance with another aspect of the disclosure, an electronic device including a speaker is provided. The electronic device includes a main housing including a main base and a main body extending from the main base. The electronic device may include a cover housing connected to the main body. The electronic device may include a speaker including a speaker body provided inside the main housing and the cover housing and a protective plate, of which at least a portion is exposed to an outside the main housing, connected to the speaker body.

In accordance with another aspect of the disclosure, an electronic device including a speaker is provided. The electronic device includes a main housing including a stainless-steel material. The electronic device may include a cover housing connected to the main housing and including a stainless-steel material. The electronic device may include a speaker provided inside the main housing and the cover housing. The electronic device may include a guide including a guide base seated on the main housing to support the speaker and a guide body extending from the guide base in a first direction and overlapping the speaker in a second direction perpendicular to the first direction. The main housing may include a main base in contact with the guide base in the first direction and a main body extending from an outer edge of the main base to be in contact with the guide base and the guide body in the second direction.

According to an embodiment of the disclosure, in response to a speaker being seated on a housing made of a stainless-steel material, it may be possible to improve mountability by providing a guide capable of supporting the speaker to prevent the speaker from moving unintentionally.

According to an embodiment of the disclosure, it may be possible to enhance structural stability by preventing a protective plate of a speaker from protruding from a main housing to the outside.

According to an embodiment of the disclosure, it may be possible to improve stability by providing a housing made of a stainless steel material, which forms an exterior, and it may be possible to design a shape freely by providing a guide, which is a separate component, that is seated inside the stainless steel material to support a speaker.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 12A is a cross-sectional view of a sound output module according to an embodiment of the disclosure;

FIG. 12B is a cross-sectional view illustrating a sound output module of FIG. 12A viewed from a different angle according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
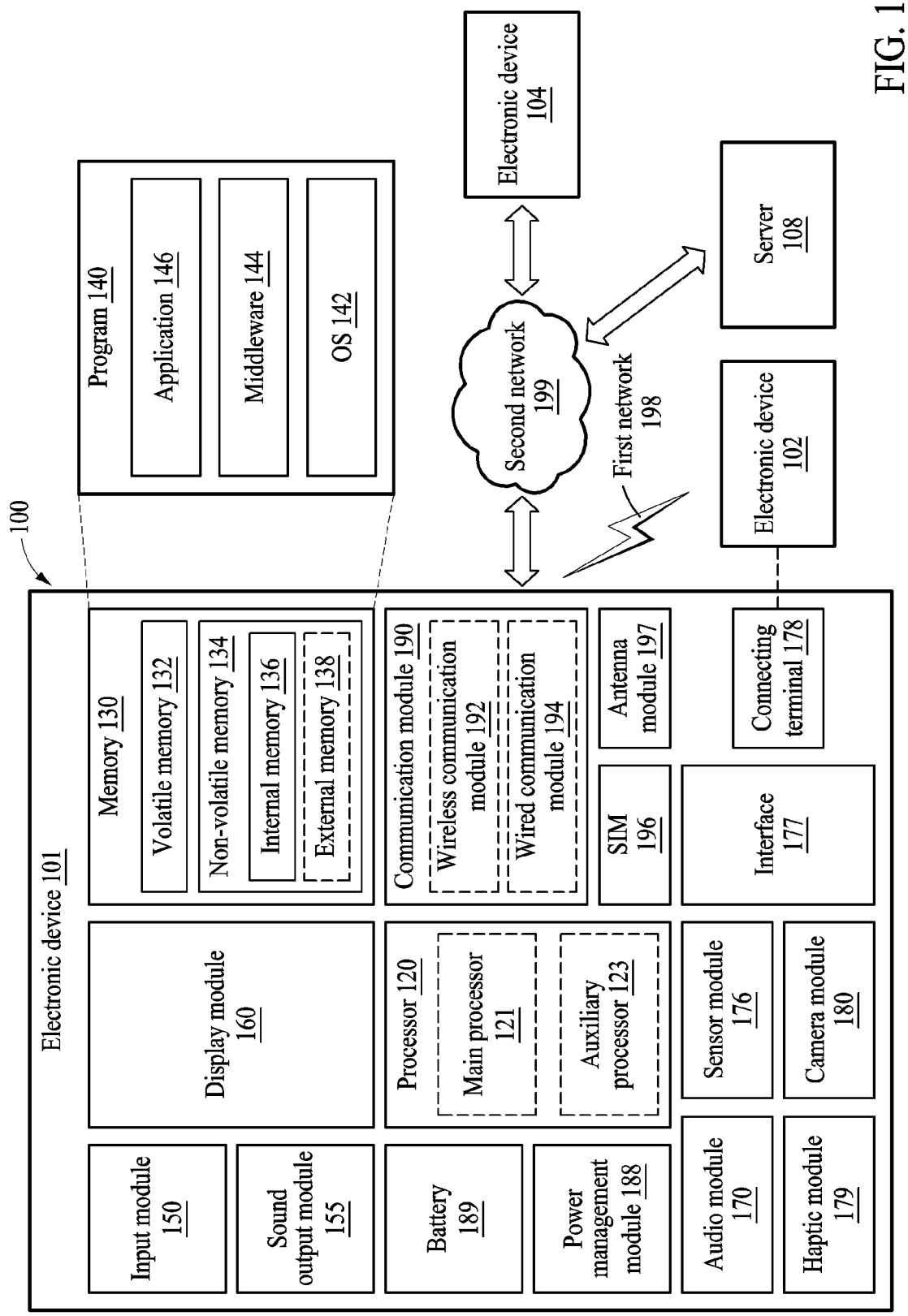
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or communicate with at least one of an external electronic device 104 and a server 108 via a second network 199 (e.g., a long-range wireless communication network). According to an example embodiment of the disclosure, the electronic device 101 may communicate with the external electronic device 104 via the server 108. According to an example embodiment of the disclosure, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one (e.g., the connecting terminal 178) of the above components may be omitted from the electronic device 101, or one or more of other components may be added to the electronic device 101. In some embodiments of the disclosure, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment of the disclosure, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment of the disclosure, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment of the disclosure, the auxiliary processor 123 (e.g., an ISP or a CP) may be implemented as a portion of another component (e.g., the camera module 180 or the communication module 190) that is functionally related to the auxiliary processor 123. According to an example embodiment of the disclosure, the auxiliary processor 123 (e.g., an NPU) may include a hardware structure specifically for artificial intelligence (AI) model processing. An artificial intelligence model may be generated by machine learning. The machine learning may be performed by, for example, the electronic device 101, in which artificial intelligence is performed, or performed via a separate server (e.g., the server 108). Learning algorithms may include, but are not limited to, for example, supervised learning, unsupervised learning, semi-supervised learning, or reinforcement learning. The artificial intelligence (AI) model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but examples of which are not limited thereto. The AI model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive, from the outside (e.g., a user) the electronic device 101, a command or data to be used by another component (e.g., the processor 120) of the electronic device 101. The input module 150 may include, for example, a microphone, a mouse, a keyboard, a key (e.g., a button), or a digital pen (e.g., a stylus pen).

The sound output module 155 may output a sound signal to the outside the electronic device 101. The sound output module 155 may include, for example, a speaker or a receiver. The speaker may be used for general purposes, such as playing multimedia or playing a record. The receiver may be used to receive an incoming call. According to an example embodiment of the disclosure, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control its corresponding one of the display, the hologram device, and the projector. According to an example embodiment of the disclosure, the display module 160 may include a touch sensor adapted to detect a touch, or a pressure sensor adapted to measure an intensity of a force incurred of the touch.

The audio module 170 may convert sound into an electric signal or vice versa. According to an example embodiment of the disclosure, the audio module 170 may obtain the sound via the input module 150 or output the sound via the sound output module 155 or an external electronic device (e.g., an external electronic device 102, such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more of specified protocols to be used by the electronic device 101 to couple with the external electronic device (e.g., the external electronic device 102) directly (e.g., by wire) or wirelessly. According to an example embodiment of the disclosure, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may physically connect to an external electronic device (e.g., the external electronic device 102). According to an example embodiment of the disclosure, the connecting terminal 178 may include, for example, an HDMI connector, a USB connector, an SD card connector, or an audio connector (e.g., a headphones connector).

The haptic module 179 may convert an electric signal into a mechanical stimulus (e.g., a vibration or a movement) or an electrical stimulus, which may be recognized by a user via their tactile sensation or kinesthetic sensation. According to an example embodiment of the disclosure, the haptic module 179 may include, for example, a motor, a piezoelectric element, or an electric stimulator.

The camera module 180 may capture a still image and moving images. According to an example embodiment of the disclosure, the camera module 180 may include one or more of lenses, image sensors, ISPs, and flashes.

The power management module 188 may manage power supplied to the electronic device 101. According to an example embodiment of the disclosure, the power management module 188 may be implemented as, for example, at least a part of a power management integrated circuit (PMIC).

The battery 189 may supply power to at least one component of the electronic device 101. According to an example embodiment of the disclosure, the battery 189 may include, for example, a primary cell which is not rechargeable, a secondary cell which is rechargeable, or a fuel cell.

The communication module 190 may support establishing a direct (e.g., by wire) communication channel or a wireless communication channel between the electronic device 101 and the external electronic device (e.g., the external electronic device 102, the external electronic device 104, or the server 108) and performing communication via the established communication channel. The communication module 190 may include one or more of CPs that are operable independently from the processor 120 (e.g., an AP) and that support direct (e.g., by wire) communication or wireless communication. According to an example embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a millimeter wave (mmWave) band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large-scale antenna. The wireless communication module 192 may support various requirements specified in the electronic device 101, an external electronic device (e.g., the external electronic device 104), or a network system (e.g., the second network 199). According to an example embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment of the disclosure, the antenna module 197 may include an antenna including a radiating element including a conductive material or a conductive pattern formed in or on a substrate (e.g., a printed circuit board (PCB)). According to an example embodiment of the disclosure, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an example embodiment of the disclosure, another component (e.g., a radio frequency integrated circuit (RFIC)) other than the radiating element may be additionally formed as a part of the antenna module 197.

According to various embodiments of the disclosure, the antenna module 197 may form a mmWave antenna module. According to an example embodiment of the disclosure, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of the same type as or a different type than the electronic device 101. According to an embodiment of the disclosure, all or some of operations to be executed by the electronic device 101 may be executed by one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more of external electronic devices to perform at least part of the function or service. The one or more of external electronic devices receiving the request may perform the at least part of the function or service, or an additional function or an additional service related to the request, and may transfer an outcome of the performing to the electronic device 101. The electronic device 101 may provide the result, with or without further processing of the result, as at least part of a response to the request. To that end, cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an Internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various example embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be appreciated that various example embodiments of the disclosure and the terms used therein are not intended to limit the technological features set forth herein to particular example embodiments and include various changes, equivalents, or replacements for a corresponding example embodiment. In connection with the description of the drawings, like reference numerals may be used for similar or related components. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., by wire), wirelessly, or via a third element.

As used in connection with various example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more of functions. For example, according to an embodiment of the disclosure, the module may be implemented in a form of an application-specific integrated circuit (ASIC).

Various example embodiments as set forth herein may be implemented as software (e.g., the program 140) including one or more of instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more of instructions stored in the storage medium, and execute it. This allows the machine to be operated to perform at least one function according to the at least one instruction invoked. The one or more of instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various example embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more of other components may be added. Alternatively or additionally, a plurality of components (e.g., modules or programs) may be integrated into a single component. In such a case, according to various embodiments of the disclosure, the integrated component may still perform one or more of functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2A:
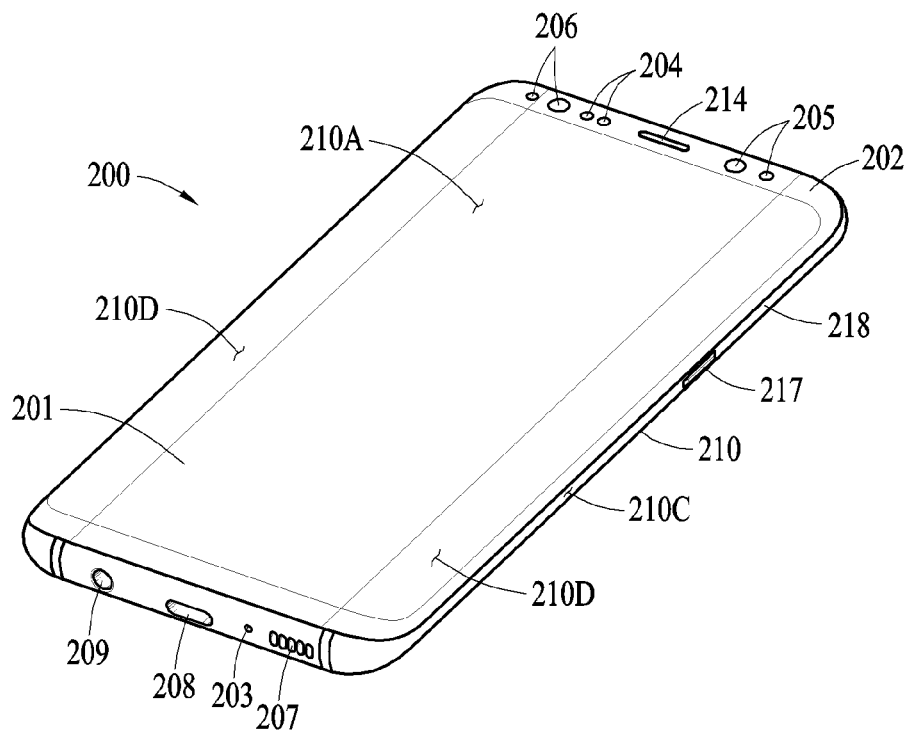
FIG. 2A is a perspective view of a front surface of a mobile electronic device according to an embodiment of the disclosure.
Figure 2B:
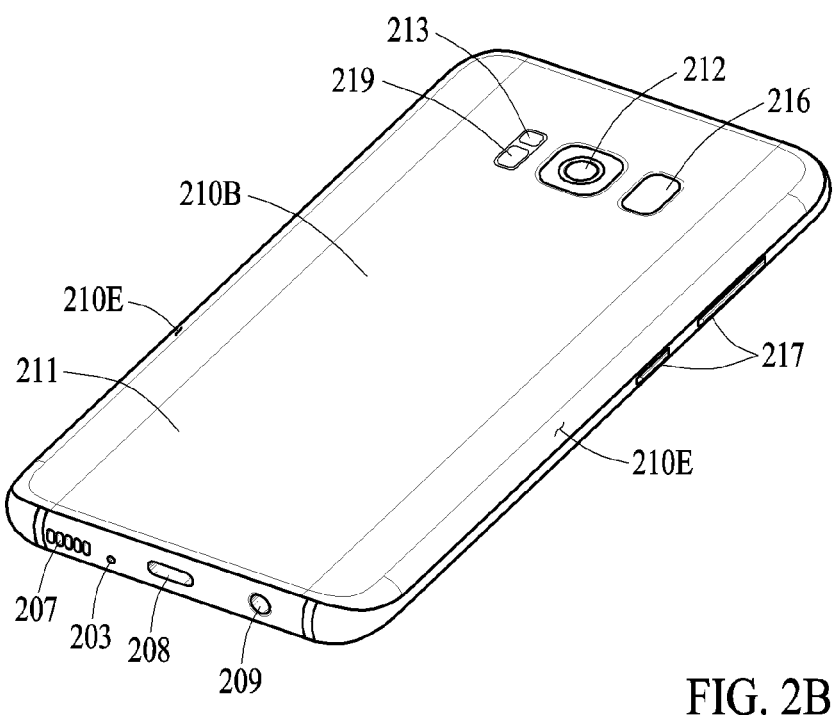
FIG. 2B is a perspective view of a rear surface of an electronic device of FIG. 2A according to an embodiment of the disclosure.

FIG. 2A is a perspective view of a front surface of a mobile electronic device according to an embodiment of the disclosure, and FIG. 2B is a perspective view of a rear surface of the electronic device of FIG. 2A according to an embodiment of the disclosure.

Referring to FIGS. 2A and 2B, an electronic device 200 according to an example embodiment may include a housing 210 including a first surface (or a front surface) 210A, a second surface (or a rear surface) 210B, and a side surface 210C surrounding a space between the first surface 210A and the second surface 210B. In an embodiment (not shown) of the disclosure, the housing may also be a structure which forms a portion of the first surface 210A, the second surface 210B, and the side surface 210C of FIGS. 2A and 2B. In an embodiment of the disclosure, the first surface 210A may be formed of a front plate 202 (e.g., a polymer plate or a glass plate including various coating layers) of which at least a portion is substantially transparent. The second surface 210B may be formed of a back plate 211 that is substantially opaque. For example, the back plate 211 may be formed of coated or colored glass, ceramic, polymer, metal materials (e.g., aluminum, stainless steel (SS), or magnesium) or a combination of at least two of the above materials. The side surface 210C may be coupled to the front plate 202 and the back plate 211 and may be formed by a side plate (or a "side member") 218 including metal and/or polymer. In some embodiments of the disclosure, the back plate 211 and the side plate 218 may be integrally formed and may include the same material (e.g., a metal material, such as aluminum).

In the illustrated embodiment of the disclosure, the front plate 202 may include two first areas 210D that are curved and extend seamlessly from the first surface 210A toward the back plate 211, at both ends of a long edge of the front plate 202. In the illustrated embodiment of the disclosure, the back plate 211 may include two second areas 210E that are curved and extend seamlessly from the second surface 210B toward the front plate 202, at both ends of a long edge thereof. In some embodiments of the disclosure, the front plate 202 (or the back plate 211) may include only one of the first areas 210D (or the second areas 210E). In another embodiment of the disclosure, some of the first areas 210D or the second areas 210E may not be included. In an embodiment of the disclosure, when viewed from a side surface of the electronic device 200, the side plate 218 may have a first thickness (or width) in a direction of a side surface not including the first areas 210D or the second areas 210E, and have a second thickness less than the first thickness in a direction of a side surface including the first areas 210D or the second areas 210E. In an embodiment of the disclosure, the first areas 210D or the second areas 210E may be formed to be flat instead of being bent, to form a substantially single plane with the first surface 210A or the second surface 210B.

According to an embodiment of the disclosure, the electronic device 200 may include at least one of a display 201, audio modules 203, 207, and 214, sensor modules 204, 216, and 219, camera modules 205, 212, and 213, key input devices 217, a light-emitting element 206, and connector holes 208 and 209. In some embodiments of the disclosure, the electronic device 200 may not include at least one (e.g., the key input devices 217 or the light-emitting element 206) of the components, or may additionally include other components.

The display 201 may be exposed through a substantial portion of the front plate 202, for example. In some embodiments of the disclosure, at least a portion of the display 201 may be exposed through the front plate 202 that forms the first surface 210A and the first areas 210D of the side surface 210C. In some embodiments of the disclosure, an edge of the display 201 may be formed in a shape substantially the same as the shape of the periphery of the front plate 202 adjacent thereto. In another example embodiment (not shown), in order to enlarge the exposed area of the display 201, a distance between the edge of the display 201 and the periphery of the front plate 202 may be substantially the same.

In an example embodiment (not shown), a recess or an opening may be formed in a portion of a screen display area of the display 201, and at least one of the audio module 214, the sensor module 204, and the camera module 205, and the light-emitting element 206 that are aligned with the recess, or the opening may be included. In an example embodiment (not shown), a rear surface of the screen display area of the display 201 may include at least one of the audio module 214, the sensor module 204, the camera module 205, the sensor module 216 (e.g., a fingerprint sensor), and the light-emitting element 206. In an example embodiment (not shown), the display 201 may be coupled to or disposed adjacent to a touch detection circuit, a pressure sensor for measuring an intensity (pressure) of a touch, and/or a digitizer for detecting a magnetic-type stylus pen. In some embodiments of the disclosure, at least a portion of the sensor modules 204 and 219, and/or at least a portion of the key input device 217 may be disposed in the first areas 210D and/or the second areas 210E.

The audio modules 203, 207, and 214 may include a plate hole 203, speaker holes 207 and 214, and a microphone (not shown) provided in the housing 210. The plate hole 203 may guide sound from the outside to the microphone. The speaker holes 207 and 214 may include an external speaker hole 207 and a receiver hole for a call 214. In some embodiments of the disclosure, the speaker holes 207 and 214 and the plate hole 203 may be implemented as a single hole, or a speaker (e.g., a piezo speaker) may be included without the speaker holes 207 and 214.

The sensor modules 204, 216, and 219 may generate an electrical signal or a data value corresponding to an internal operating state of the electronic device 200 or an external environmental state. The sensor modules 204, 216, and 219 may include, for example, a first sensor module 204 (e.g., a proximity sensor) and/or a second sensor module (not shown) (e.g., a fingerprint sensor) disposed on the first surface 210A of the housing 210, and/or a third sensor module 219 (e.g., a heart rate monitoring (HRM) sensor) and/or a fourth sensor module 216 (e.g., a fingerprint sensor) disposed on the second surface 210B of the housing 210. The fingerprint sensor may be disposed on both the first surface 210A (e.g., the display 201) and the second surface 210B of the housing 210. The electronic device 200 may further include at least one of sensor modules (not shown), for example, a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor 204.

The camera modules 205, 212, and 213 may include a first camera device 205 disposed on the first surface 210A of the electronic device 200, a second camera device 212 disposed on the second surface 210B, and/or a flash 213. The camera modules 205 and 212 may each include one or more of lenses, an image sensor, and/or an image signal processor. A flash 213 may include, for example, a light-emitting diode (LED) or a xenon lamp. In some embodiments of the disclosure, two or more lenses (e.g., infrared camera, wide-angle, and telephoto lenses) and image sensors may be disposed on one surface of the electronic device 200.

The key input devices 217 may be disposed on the side surface 210C of the housing 210. In another embodiment of the disclosure, the electronic device 200 may not include some or any of the key input devices 217 mentioned above, and the key input device 217 that is not included may be implemented in another form, such as a soft key on the display 201. In some embodiments of the disclosure, the key input devices 217 may include the sensor module 216 disposed on the second surface 210B of the housing 210.

The light-emitting element 206 may be disposed on, for example, the first surface 210A of the housing 210. The light-emitting element 206 may provide, for example, state information of the electronic device 200 in the form of light. In another embodiment of the disclosure, the light-emitting element 206 may provide, for example, a light source that is linked to the operation of the camera module 205. The light-emitting element 206 may include, for example, an LED, an IR LED, and a xenon lamp.

The connector holes 208 and 209 may include a first connector hole 208 for accommodating a connector (e.g., a universal serial bus (USB) connector) for transmitting and receiving power and/or data to and from an external electronic device, and/or a second connector hole 209 (e.g., an earphone jack) for accommodating a connector for transmitting and receiving an audio signal to and from an external electronic device. The electronic device 200 according to an embodiment of the disclosure may include an electronic device, such as a bar type, a foldable type, a rollable type, a slidable type, a wearable type, and a tablet personal computer (PC) and/or a notebook PC. The electronic device 200 according to an embodiment of the disclosure is not limited to the above-described example, and may include various other electronic devices.

Figure 3A:
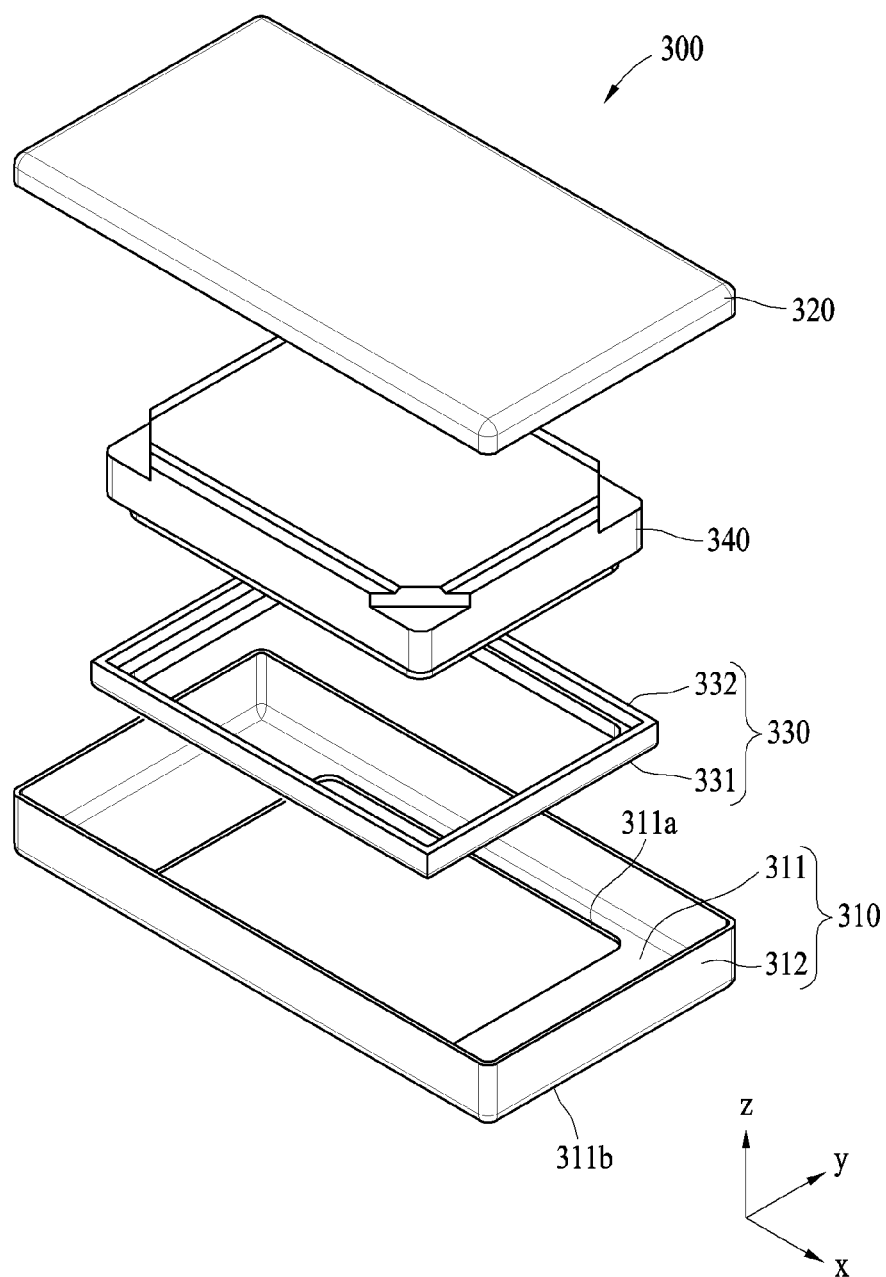
FIG. 3A is an exploded perspective view of a sound output module according to an embodiment of the disclosure.
Figure 3B:
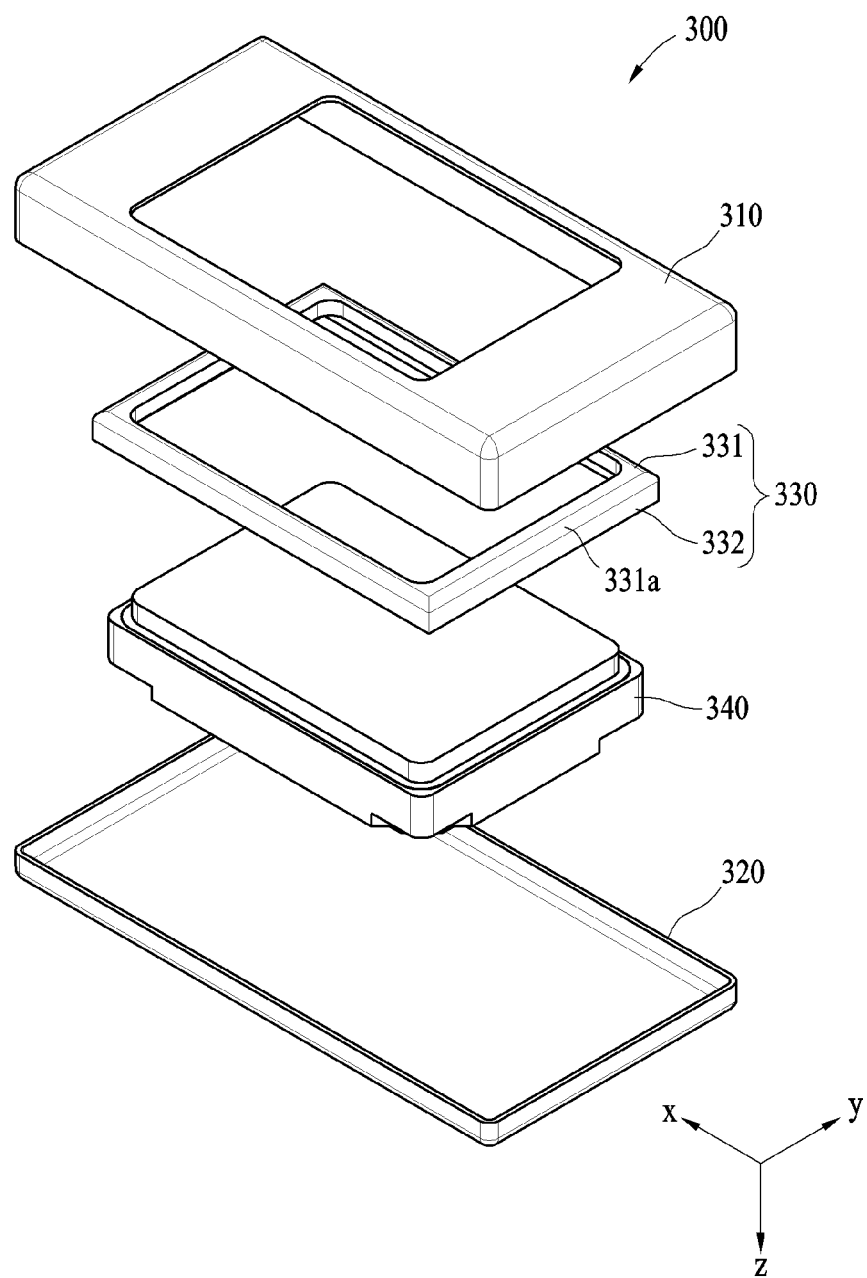
FIG. 3B is an exploded perspective view of a sound output module of FIG. 3A viewed from a different angle according to an embodiment of the disclosure.
Figure 3C:
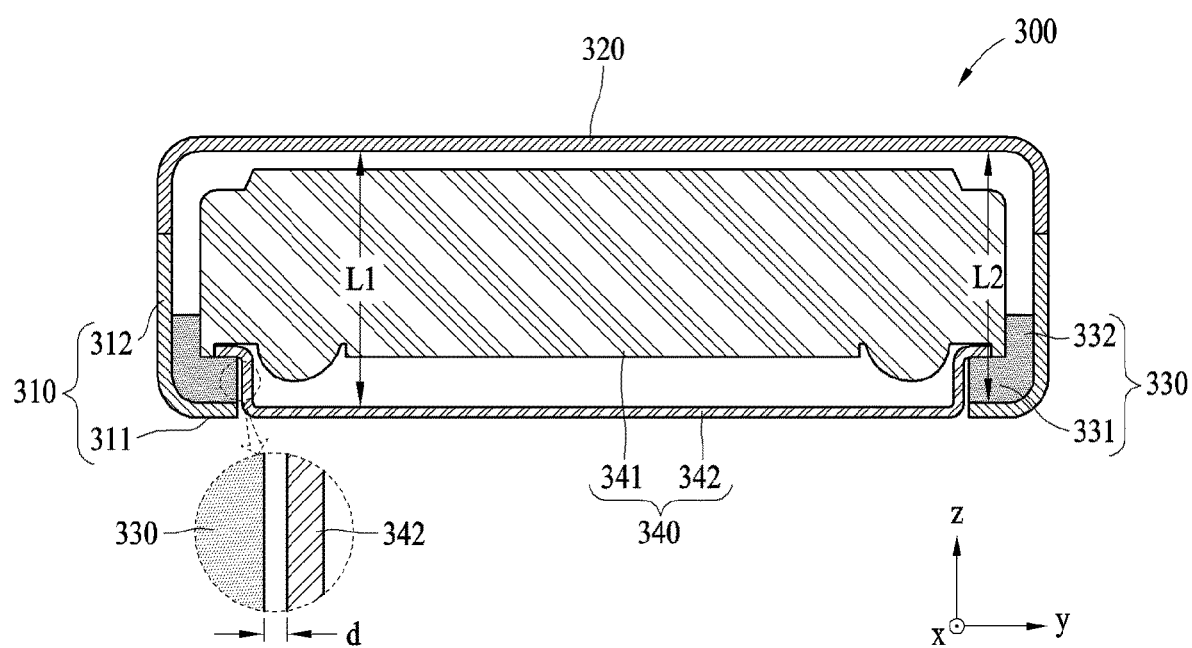
FIG. 3C is a cross-sectional view of a sound output module according to an embodiment of the disclosure.

FIG. 3A is an exploded perspective view of a sound output module according to an embodiment of the disclosure. FIG. 3B is an exploded perspective view of a sound output module of FIG. 3A viewed from a different angle according to an embodiment of the disclosure. FIG. 3C is a cross-sectional view of a sound output module according to an embodiment of the disclosure.

Referring to FIGS. 3A to 3C, in an embodiment of the disclosure, an electronic device (e.g., the electronic device 101 of FIG. 1, and the electronic device 200 of FIG. 2A) may include a sound output module 300 (e.g., the sound output module 155 of FIG. 1) including a speaker 340. The sound output module 300 may be included not only in an electronic device (e.g., the electronic device 200 of FIG. 2A) in a form of a terminal, such as a mobile phone, a tablet, or a desktop but also in a sound device using a speaker, such as a headset, television (TV), or a home theater. An electronic device in which the sound output module 300 is provided is not limited thereto. The sound output module 300 may include a main housing 310, a cover housing 320, a guide 330, and a speaker 340. The speaker 340 may include a speaker body 341 and a protective plate 342. The speaker body 341 may include a diaphragm, and the protective plate 342 may protect the diaphragm.

In an embodiment of the disclosure, the main housing 310 may expose a portion of the protective plate 342 of the speaker 340. For example, the main housing 310 may include an opening formed to penetrate through a central portion thereof and may expose the protective plate 342 through the opening. The main housing 310 may include a main base 311 formed in parallel to an xy plane, and a main body 312 expending toward a z-axial direction from the main base 311. Herein, the z-axial direction may be referred to as a first direction. The main housing 310 may include a stainless-steel material.

In an embodiment of the disclosure, the main base 311 may support the guide 330. The main base 311 may be provided approximately parallel to a central portion of the protective plate 342. The main base 311 may include an inner edge 311a and an outer edge 311b. The inner edge 311a and the outer edge 311b may each have a loop shape. An inner side of the inner edge 311a may be an opening to expose the protective 342 to the outside.

In an embodiment of the disclosure, the main body 312 may extend from the outer edge 311b of the main base 311. The main body 312 may face the guide 330 in a direction parallel to the xy plane, that is, a direction perpendicular to the z-axis. Herein, the direction parallel to the xy plane or the direction perpendicular to the z-axis may be referred to as a second direction. A connecting portion of the main base 311 and the main body 312 may have a curved shape.

In an embodiment of the disclosure, the main base 311 and the main body 312 may support at least two surfaces of the guide 330 to assist the guide 330 to be fixed and not unintentionally movable. For example, the main base 311 and the main body 312 may support a bottom surface and an outer side surface of the guide 330.

In an embodiment of the disclosure, the cover housing 320 may be connected to the main housing 310. For example, the cover housing 320 may be coupled to the main housing 310 to protect the guide 330 and the speaker 340 in a state in which the guide 330 and the speaker 340 are disposed inside the main housing 310. The cover housing 320 may include a stainless-steel material. The main housing 310 and the cover housing 320 may accommodate the speaker 340.

In an embodiment of the disclosure, the main housing 310 and the cover housing 320 may include a mesh that may reduce or prevent an influx of a foreign material and/or moisture into a diaphragm of the speaker 340.

In an embodiment of the disclosure, the guide 330 may be disposed in the main housing 310 to support the speaker 340.

The guide 330 may be formed of a material from which it is easy to manufacture a relatively complex shape compared with the main housing 310. For example, the guide 330 may include a plastic material. The guide 330 may be manufactured by a double injection method. The guide 330 may include a portion supporting one surface of the speaker 340 and a portion supporting a side surface of the speaker 340. The guide 330 may stably support the speaker 340 by supporting at least one or more of surfaces of the speaker 340. For example, the guide 330 may be bonded to the at least one or more of surfaces of the speaker 340. The speaker 340 may be supported by the guide 330, and accordingly, an unintentional movement of the speaker 340 may be prevented. The guide 330 may be provided between the main housing 310 and the speaker 340. The guide 330 may be bonded to the speaker 340. For example, the guide 330 may be bonded to at least one of the speaker body 341 and the protective plate 342. The guide 330 may be assembled with the main housing 310 by an adhesion method using glue and heat. The guide 330 and the main housing 310 may have structures that engage with each other by a double injection method and/or an insert injection method. The guide 330 may include a guide base 331 and a guide body 332.

In an embodiment of the disclosure, the guide base 331 may be disposed in the main base 311. The guide base 331 may include a curved portion 331a formed on an outer edge portion. The guide base 331 may have a shape of an outer side surface corresponding to a shape of an inner side surface of the main housing 310. The guide base 331 may maintain a state in surface contact with the main housing 310.

In an embodiment of the disclosure, the guide body 332 may extend from the guide base 331. The guide body 332 may extend in parallel to the main body 312 and maintain a state of being in surface contact with the main body 312. The guide body 332 may overlap the speaker 340 in the second direction. An inner side surface of the guide body 332 may support the speaker 340. For example, the speaker 340 may be fastened to the inner side of the guide body 332 by an interference fit method.

In an embodiment of the disclosure, the speaker 340 may be provided inside the main housing 310 and the cover housing 320. The speaker 340 and the guide 330 may be assembled by an adhesion method using glue and heat. The speaker 340 may have a structure coupled to the guide 330 by an interference fit method. The speaker 340 may include a speaker body 341 and the protective plate 342. The protective plate 342 may be spaced apart from the guide 330 in the second direction. According to this structure, the protective plate 342 may inserted into an inner space of the guide 330 without being interfered with by the guide 330. For example, a fine gap d may be present between the protective plate 342 and the guide 330.

In an embodiment of the disclosure, a first distance L1 from the bottom surface of the cover housing 320 to the protective plate 342 may be less than a second distance L2 from the bottom surface of the cover housing 320 to the guide base 331. According to this structure, as the protective plate 342 may not protrude to the outside, the protective plate 342 may be protected from an external impact.

Figure 4A:
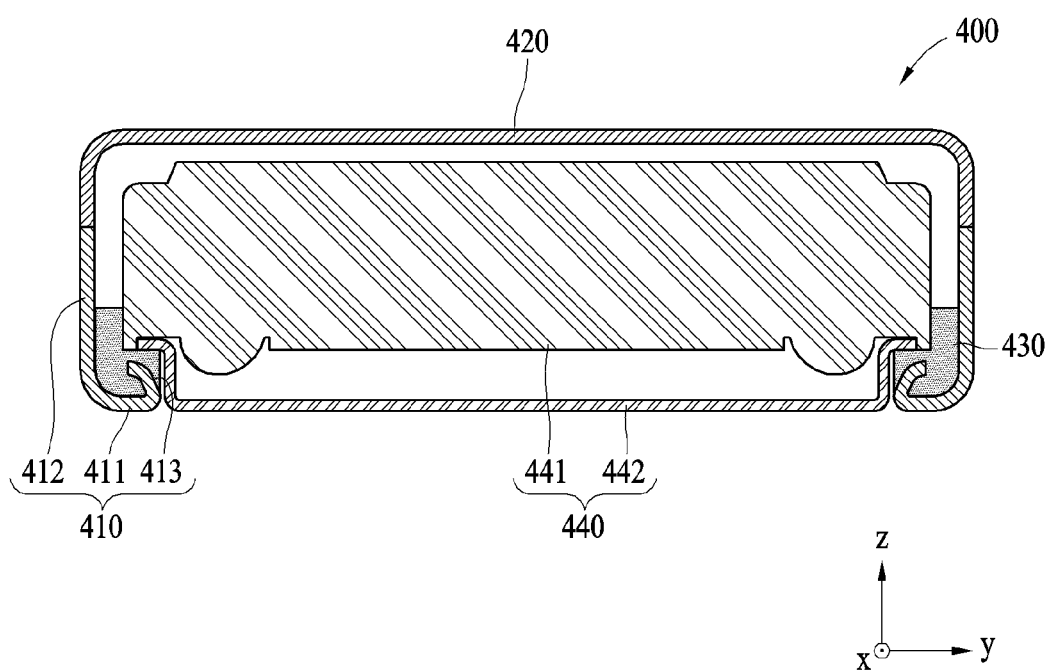
FIG. 4A is a cross-sectional view of a sound output module according to an embodiment of the disclosure.
Figure 4B:
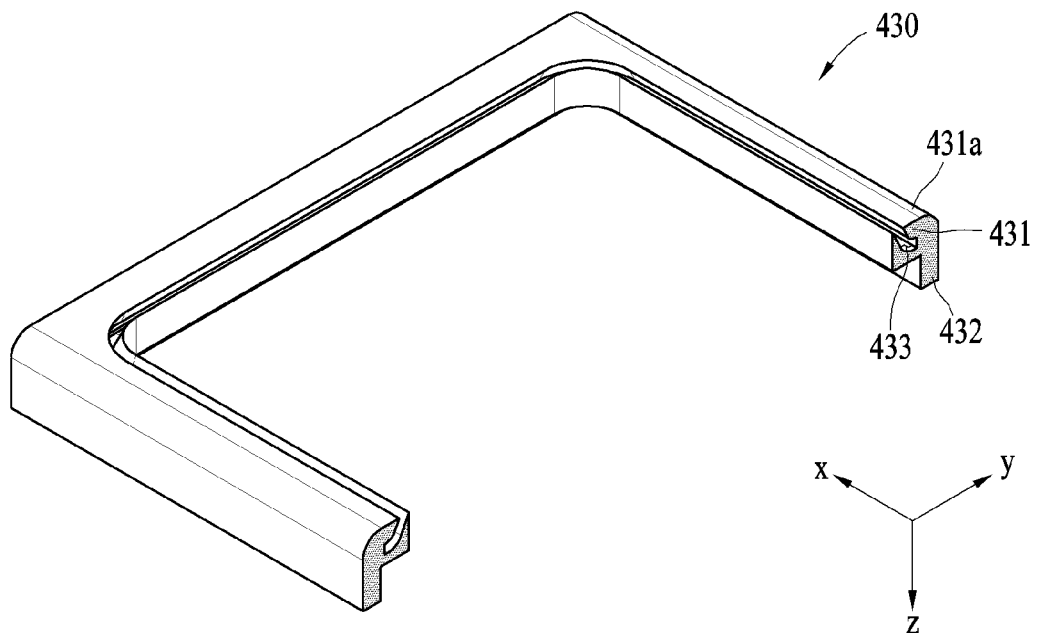
FIG. 4B is a perspective view of a guide according to an embodiment of the disclosure.

FIG. 4A is a cross-sectional view of a sound output module according to an embodiment of the disclosure, and FIG. 4B is a perspective view of a guide according to an embodiment of the disclosure.

Referring to FIGS. 4A and 4B, a sound output module 400 may include a main housing 410, a cover housing 420, a guide 430, and a speaker 440. At least a portion of the main housing 410 may be provided in a state of being inserted into the guide 430.

In an embodiment of the disclosure, the main housing 410 may include a stainless-steel material. In response to the manufacturing of the 410 main housing involving the use of the stainless-steel material, the main housing 410 may be installed inside a mold. In response to the main housing 410 being installed inside the mold, the guide 430 may be manufactured by a method of injecting and curing an injected object. In response to the guide 430 being manufactured, the main housing 410 and the guide 430 may be separated from the mold. The speaker 440 may include a speaker body 441 and a protective plate 442.

In an embodiment of the disclosure, the main housing 410 may include a main base 411, a main body 412, and a main rib 413. The main base 411 may be in contact with the guide base 431 in a z-axial direction. The main body 412 may extend from an outer edge of the main base 411 in the z-axial direction. The main body 412 may be in contact with the guide base 431 and the guide body 432 in a direction parallel to an xy plane. The main rib 413 may extend from an inner edge of the main base 411 to be inserted inside the guide 430.

In an embodiment of the disclosure, the main rib 413 may have a shape extending in a direction away from the main base 411 and toward the main body 412. The main rib 413 may also have a curved shape. According to this structure, the main rib 413 may be provided in a state of being more stably coupled to the guide 430.

In an embodiment of the disclosure, the guide base 431 may include a curved surface 431a provided on an edge thereof. The curved surface 431a may be in close contact with the main housing 410.

In an embodiment of the disclosure, the guide 430 may include a guide accommodating portion 433 recessed on the guide base 431. The guide accommodating portion 433 may accommodate the main rib 413.

Figure 5:
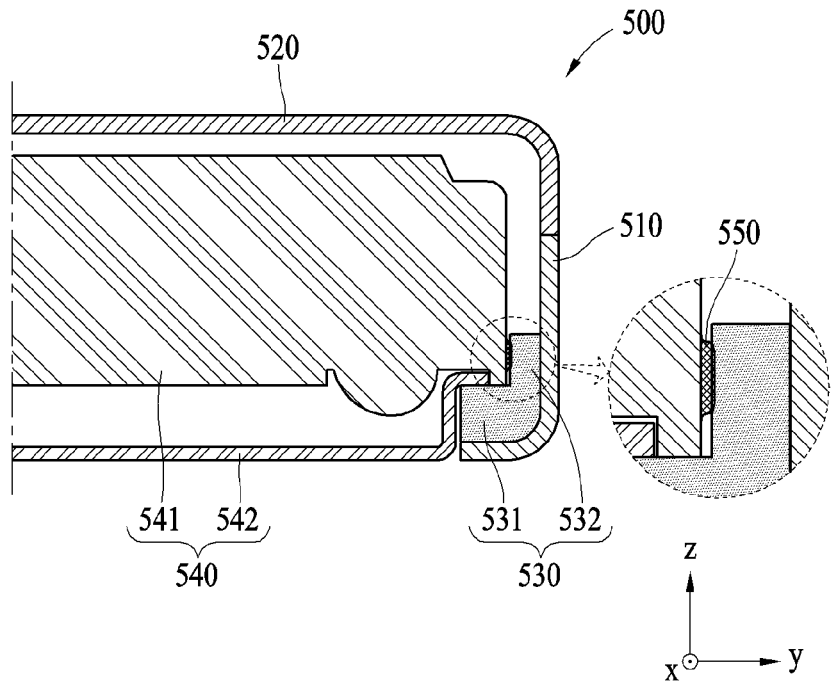
FIG. 5 is a cross-sectional view and a partially enlarged view of a sound output module according to an embodiment of the disclosure.

FIG. 5 is a cross-sectional view and a partially enlarged view of a sound output module according to an embodiment of the disclosure.

Referring to FIG. 5, in an embodiment of the disclosure, a sound output module 500 may include a main housing 510, a cover housing 520, a guide 530, a speaker 540, and a seal 550. The speaker 540 may include a speaker body 541 and a protective plate 542. The guide 530 may include a guide base 531 and a guide body 532.

In an embodiment of the disclosure, the seal 550 may be provided in a state of being compressed between the speaker body 541 and the guide body 532. For example, the seal 550 may be attached to an outer circumferential surface of the speaker body 541 in a form of surrounding the speaker body 541. The seal 550 may be compressed in a direction perpendicular to a z-axial direction by the guide body 532 in a process in which the speaker body 541 is moving in the z-axial direction to be inserted inside the guide body 532. Air flow may be blocked between a −z side area and +z side area with respect to the seal 550. For example, the seal 550 may include a compressive member, such as rubber or sponge, or an adhesive member, such as thermal adhesive tape or glue.

Figure 6:
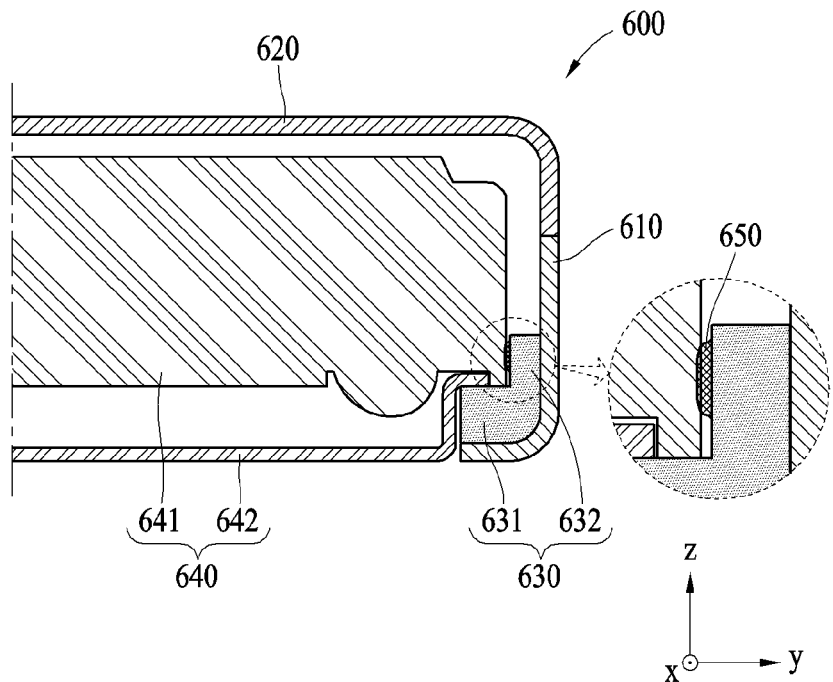
FIG. 6 is a cross-sectional view and a partially enlarged view of a sound output module according to an embodiment of the disclosure.

FIG. 6 is a cross-sectional view and a partially enlarged view of a sound output module according to an embodiment of the disclosure.

Referring to FIG. 6, in an embodiment of the disclosure, a sound output module 600 may include a main housing 610, a cover housing 620, a guide 630, a speaker 640, and a seal 650. The speaker 640 may include a speaker body 641 and a protective plate 642. The guide 630 may include a guide base 631 and a guide body 632.

In an embodiment of the disclosure, the seal 650 may be provided in a state of being compressed between the speaker body 641 and the guide body 632. For example, the seal 650 may be attached to an inner circumferential surface of the guide body 632. The seal 650 may be compressed in a direction perpendicular to a z-axial direction by the speaker body 641 in a process in which the speaker body 641 is moving in a z-axial direction to be inserted inside the guide body 632. Air flow may be blocked between a −z-side area and a +z-side area with respect to the seal 650.

Figure 7:
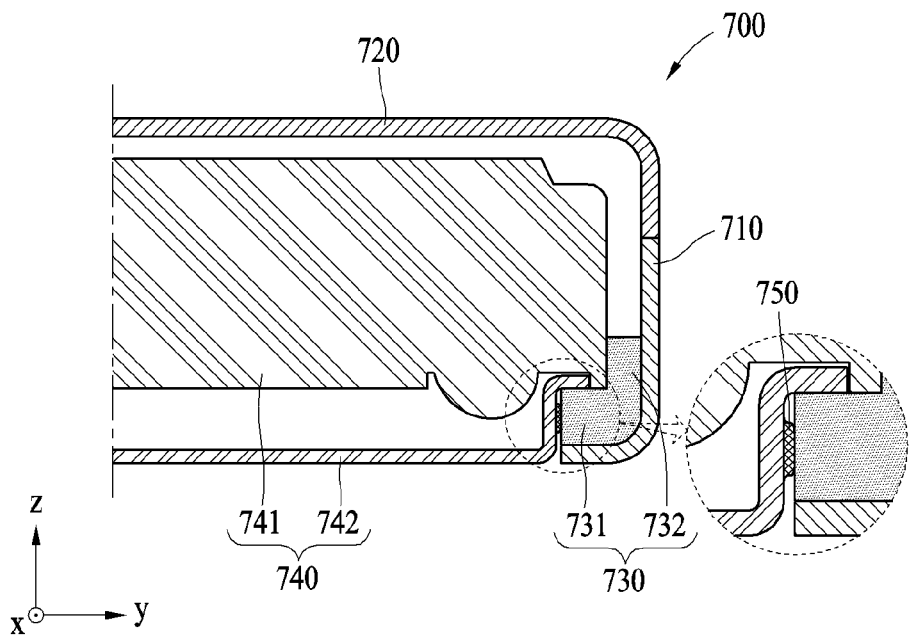
FIG. 7 is a cross-sectional view and a partially enlarged view of a sound output module according to an embodiment of the disclosure.

FIG. 7 is a cross-sectional view and a partially enlarged view of a sound output module according to an embodiment of the disclosure.

Referring to FIG. 7, in an embodiment of the disclosure, a sound output module 700 may include a main housing 710, a cover housing 720, a guide 730, a speaker 740, and a seal 750. The speaker 740 may include a speaker body 741 and a protective plate 742. The guide 730 may include a guide base 731 and a guide body 732.

In an embodiment of the disclosure, the seal 750 may be provided in a state of being compressed between the protective plate 742 and the guide base 731. For example, the seal 750 may be attached to an outer circumferential surface of the protective plate 742 in a form of surrounding the protective plate 742. The seal 750 may be compressed in a direction perpendicular to a z-axial direction by the guide base 731 in a process in which the protective plate 742 is moving in the z-axial direction to be inserted inside the guide base 731. Air flow may be blocked between a −z-side area and a +z-side area with respect to the seal 750.

Figure 8:
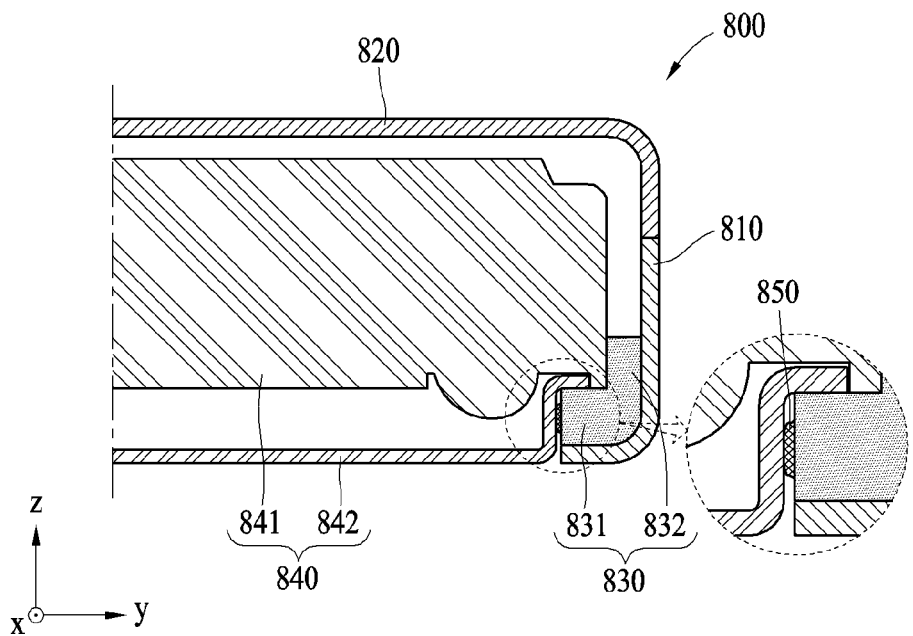
FIG. 8 is a cross-sectional view and a partially enlarged view of a sound output module according to an embodiment of the disclosure.

FIG. 8 is a cross-sectional view and a partially enlarged view of a sound output module according to an embodiment of the disclosure.

Referring to FIG. 8, in an embodiment of the disclosure, a sound output module 800 may include a main housing 810, a cover housing 820, a guide 830, a speaker 840, and a seal 850. The speaker 840 may include a speaker body 841 and a protective plate 842. The guide 830 may include a guide base 831 and a guide body 832.

In an embodiment of the disclosure, the seal 850 may be provided in a state of being compressed between the protective plate 842 and the guide base 831. For example, the seal 850 may be attached to an outer circumferential surface of the guide base 831. The seal 850 may be compressed in a direction perpendicular to a z-axial direction by the protective plate 842 in a process in which the protective plate 842 is moving in the z-axial direction to be inserted inside the guide base 831. Air flow may be blocked between a −z-side area and a +z-side area with respect to the seal 850.

Figure 9:
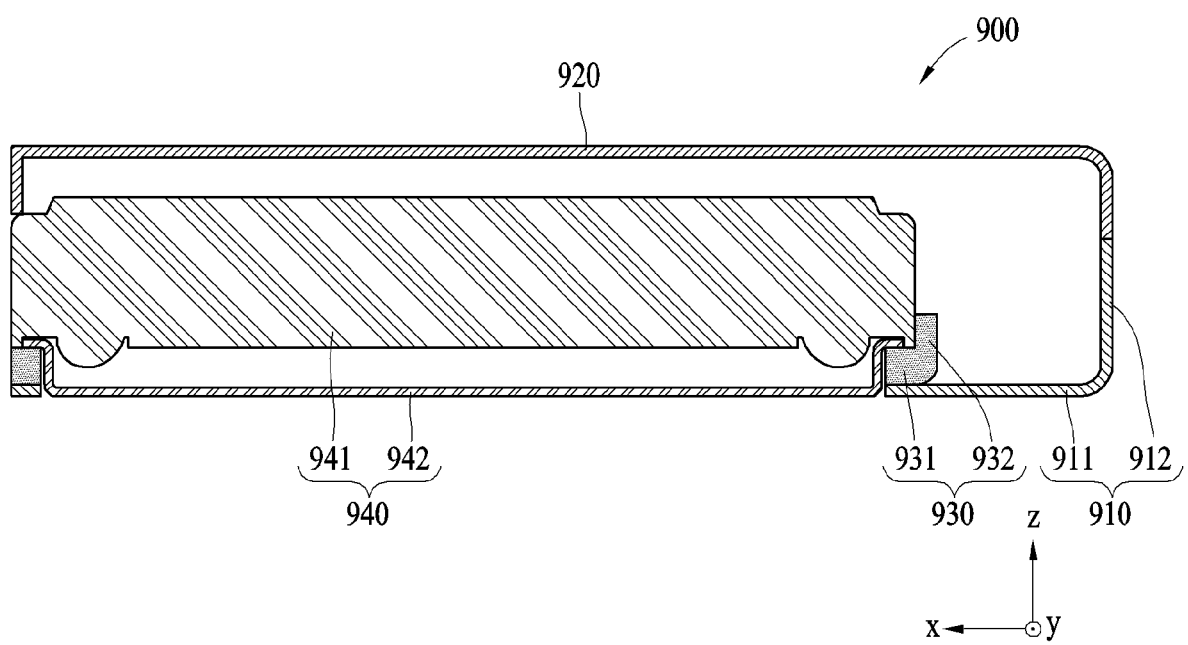
FIG. 9 is a cross-sectional view of a sound output module according to an embodiment of the disclosure.

FIG. 9 is a cross-sectional view of a sound output module according to an embodiment of the disclosure.

Referring to FIG. 9, in an embodiment of the disclosure, a sound output module 900 may include a main housing 910, a cover housing 920, a guide 930, and a speaker 940. The main housing 910 may include a main base 911 and a main body 912. The speaker 940 may include a speaker body 941 and a protective plate 942. The guide 930 may include a guide base 931 and a guide body 932.

In an embodiment of the disclosure, at least a portion of the main body 912 may have a shape spaced apart from the guide 930 in an x-axial direction. According to this shape, a sufficient space may be secured not only in a +z-side area but also in a −x-side area of the speaker 940. A movement of the speaker 940 may be prevented by the guide 930.

In an embodiment of the disclosure, at least a portion of the speaker 940 may be exposed to the outside the main housing 910 and the cover housing 920. For example, a surface of the speaker 940 facing a +x direction may be exposed to the outside.

Figure 10A:
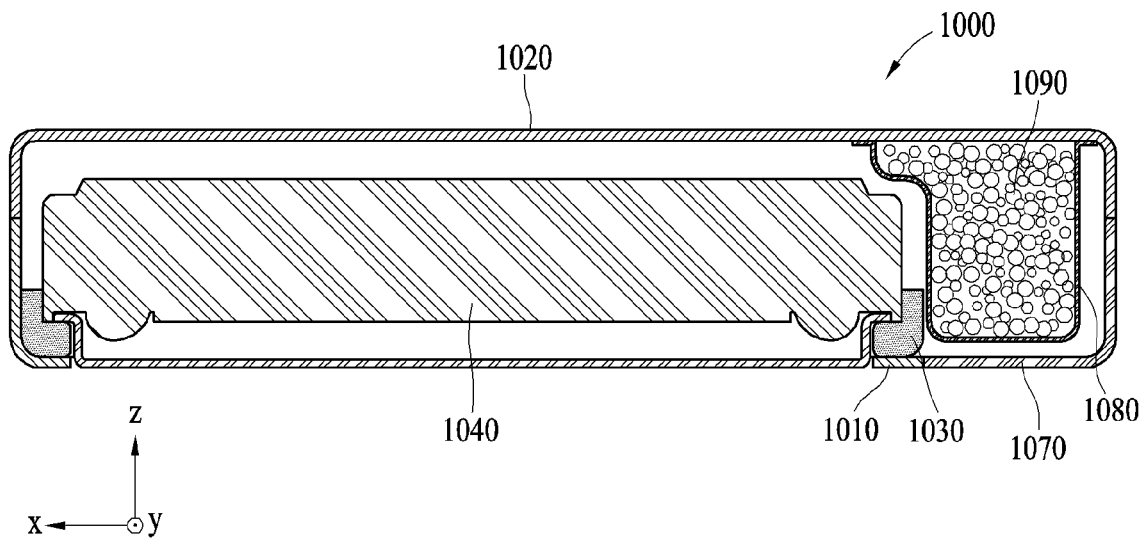
FIG. 10A is a cross-sectional view of a sound output module according to an embodiment of the disclosure.
Figure 10B:
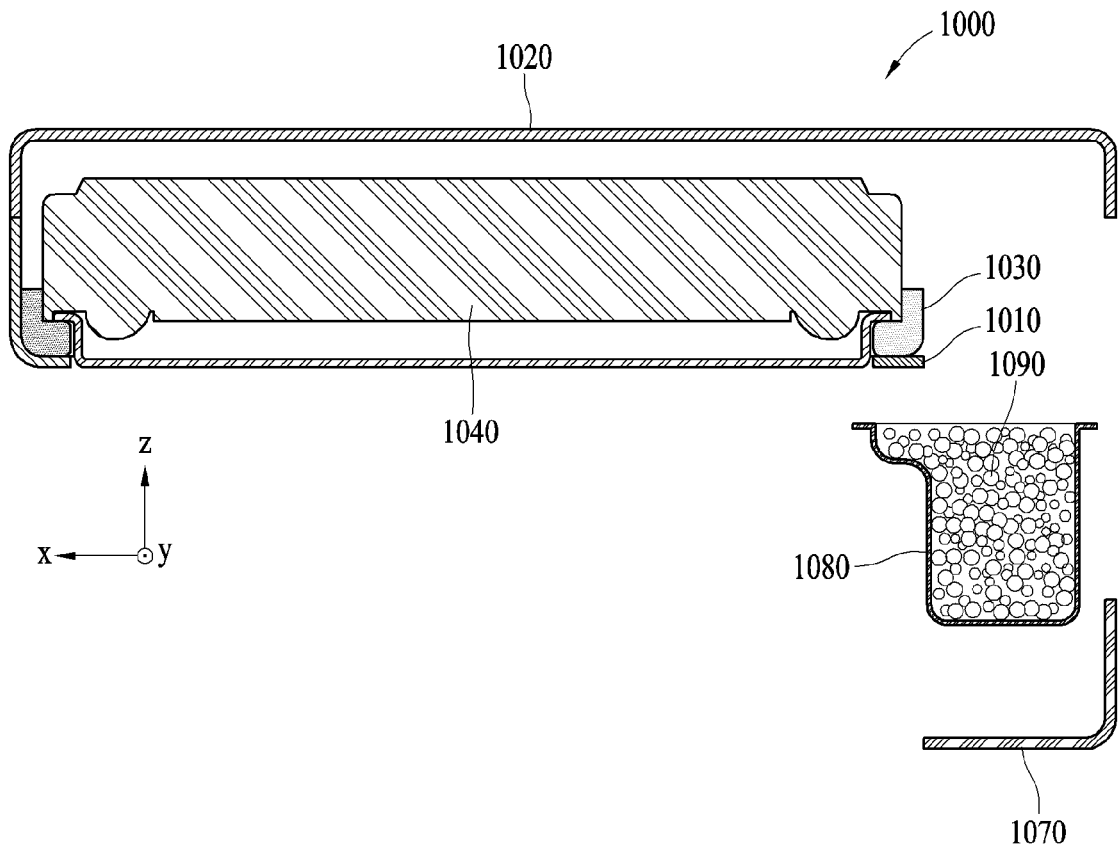
FIG. 10B is a cross-sectional view of a sound output module according to an embodiment of the disclosure.

FIG. 10A is a cross-sectional view of a sound output module according to an embodiment of the disclosure, and FIG. 10B is a cross-sectional view of a sound output module according to an embodiment of the disclosure.

Referring to FIGS. 10A and 10B, in an embodiment of the disclosure, a sound output module 1000 may include a main housing 1010, a cover housing 1020, a guide 1030, a speaker 1040, a detachable cover 1070, a pocket 1080, and a porous capsule 1090.

In an embodiment of the disclosure, the detachable cover 1070 may be detachably connected to the main housing 1010. Even if the detachable cover 1070 is removed, the sound output module 1000 may keep its shape. A user may maintain internal components of the sound output module 1000 by removing the detachable cover 1070. The detachable cover 1070 may also be detachably connected to the cover housing 1020.

In an embodiment of the disclosure, the pocket 1080 may be connected to the cover housing 1020 and provided inside the main housing 1010 and the cover housing 1020. The pocket 1080 may include a breathable material. An inner area and an outer area of the pocket 1080 may be in communication with each other such that air may flow therebetween. For example, the pocket 1080 may include a plurality of micro-holes.

In an embodiment of the disclosure, the porous capsule 1090 may be accommodated in the pocket 1080. A plurality of porous capsules 1090 may be provided. Each of the plurality of porous capsules 1090 may have the plurality of micro-holes. The plurality of porous capsules 1090 may increase performance of the sound output module 1000 by adsorbing air in an inner space of the sound output module 1000. The plurality of porous capsules 1090 is disposed in a space surrounded by the pocket 1080, and accordingly, a degree of movement by vibration may be reduced. For example, the plurality of porous capsules 1090 may be provided in a fixed state in an inner space of the pocket 1080. Shapes and/or sizes of the plurality of porous capsules 1090 may be different from each other. Sizes and a number of micro-holes of each of the plurality of porous capsules 1090 may be different from each other.

Figure 11:
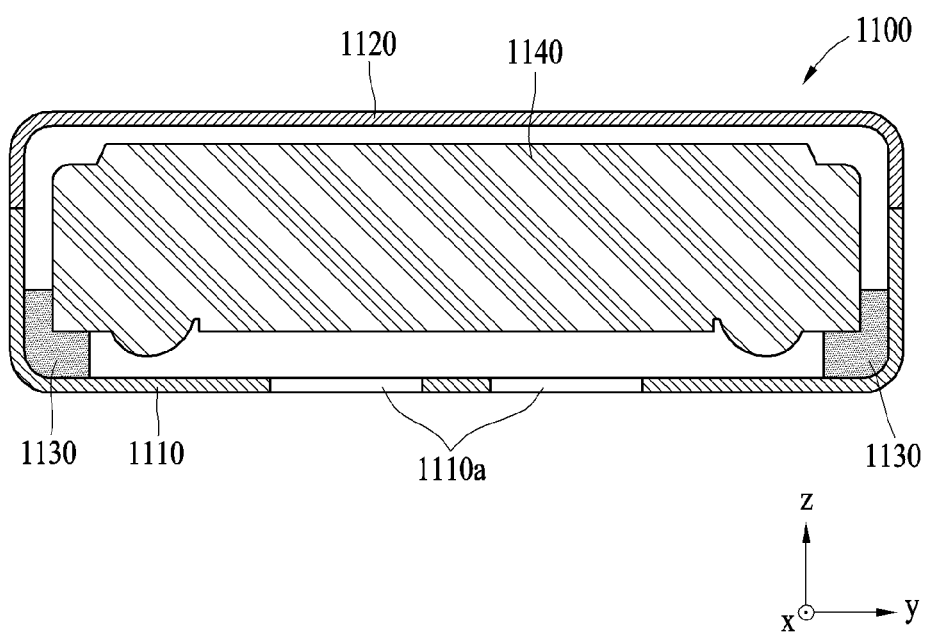
FIG. 11 is a cross-sectional view of a sound output module according to an embodiment of the disclosure.

FIG. 11 is a cross-sectional view of a sound output module according to an embodiment of the disclosure.

Referring to FIG. 11, in an embodiment of the disclosure, a sound output module 1100 may include a main housing 1110, a cover housing 1120, a guide 1130, and a speaker 1140.

In an embodiment of the disclosure, at least a portion of the main housing 1110 may perform a function of a protective plate (e.g., the protective plate 342 of FIG. 3C). For example, the main housing 1110 may cover a diaphragm (not shown) of the speaker 1140 to protect the diaphragm. The main housing 1110 may include a plurality of holes 1110a communicating between an inner space and an outer space of the main housing 1110.

FIG. 12A is a cross-sectional view of a sound output module according to an embodiment of the disclosure, and FIG. 12B is a cross-sectional view illustrating a sound output module of FIG. 12A viewed from a different angle according to an embodiment of the disclosure.

Referring to FIGS. 12A and 12B, in an embodiment of the disclosure, a sound output module 1200 may include a main housing 1210, a cover housing 1220, and a speaker 1240. The speaker 1240 may include a speaker body 1241 and a protective plate 1242.

In an embodiment of the disclosure, the main housing 1210 may be adhered to the protective plate 1242. The main housing 1210 may overlap the protective plate 1242 in a direction parallel to an xy plane.

In an embodiment of the disclosure, the speaker body 1241 may include a yoke Y formed on one surface thereof. At least a portion of the speaker body 1241 may be exposed to an outside the cover housing 1220. For example, the yoke Y of the speaker body 1241 may be exposed to the outside in a +z direction through an opening formed in the cover housing 1220.

In an embodiment of the disclosure, a −x-side area of the speaker 1240 may have an area sufficient to generate sound.

Figure 13:
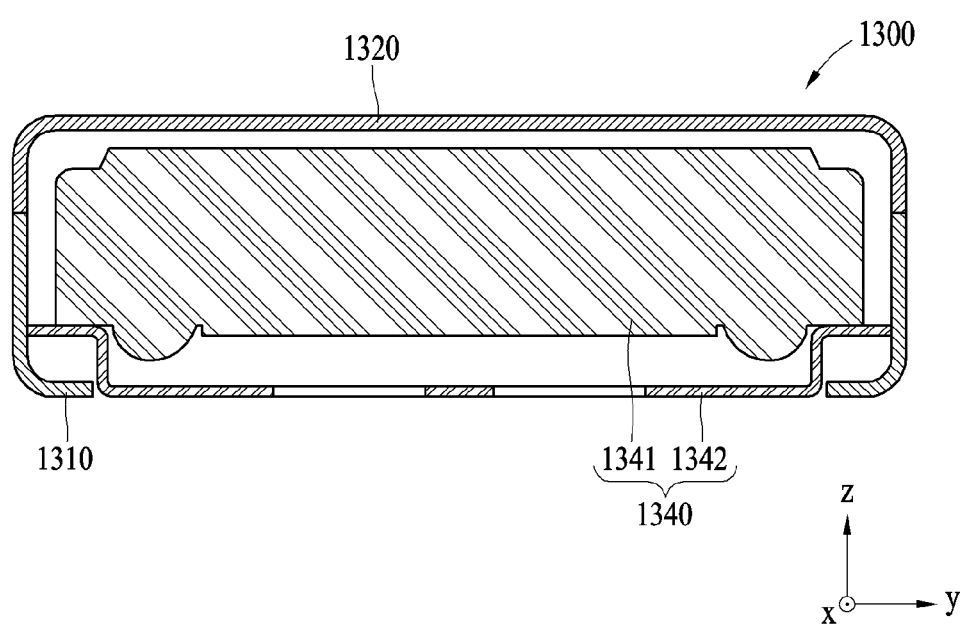
FIG. 13 is a cross-sectional view of a sound output module according to an embodiment of the disclosure.

FIG. 13 is a cross-sectional view of a sound output module according to an embodiment of the disclosure.

Referring to FIG. 13, in an embodiment of the disclosure, a sound output module 1300 may include a main housing 1310, a cover housing 1320, and a speaker 1340. The speaker 1340 may include a speaker body 1341 and a protective plate 1342.

In an embodiment of the disclosure, the protective plate 1342 may include a contacting portion connected to the speaker body 1341, a connecting portion extending from the contacting portion in a −z direction, and an exposed portion connected to the connecting portion and exposed to the outside in the −z direction. The contacting portion of the protective plate 1342 may be formed to extend outwardly in a direction parallel to an xy plane to be connected to the main housing 1310. For example, the contacting portion of the protective plate 1342 may be adhered or welded to the main housing 1310.

Figure 14:
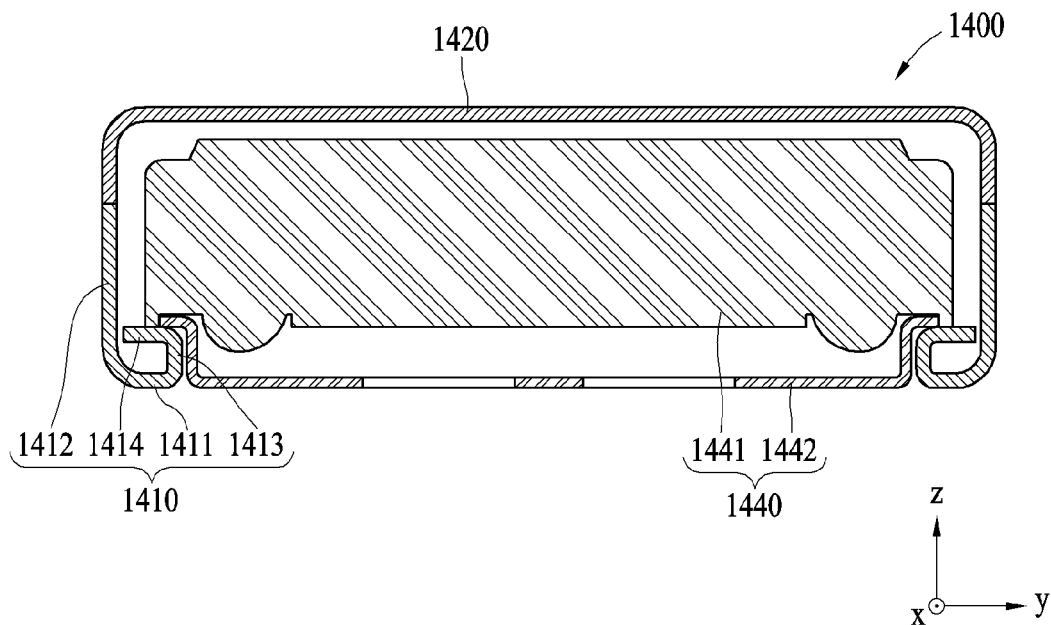
FIG. 14 is a cross-sectional view of a sound output module according to an embodiment of the disclosure.

FIG. 14 is a cross-sectional view of a sound output module according to an embodiment of the disclosure.

Referring to FIG. 14, in an embodiment of the disclosure, a sound output module 1400 may include a main housing 1410, a cover housing 1420, and a speaker 1440. The speaker 1440 may include a speaker body 1441 and a protective plate 1442. The main housing 1410 may include a main base 1411, a main body 1412 extending from an outer edge of the main base 1411 in a +z direction, a first rib 1413 extending from an inner edge of the main base 1411 in the +z direction, and a second rib 1414 extending from the first rib 1413 in a direction parallel to an xy plane. The second rib 1414 may extend in a direction toward the main body 1412.

Figure 15:
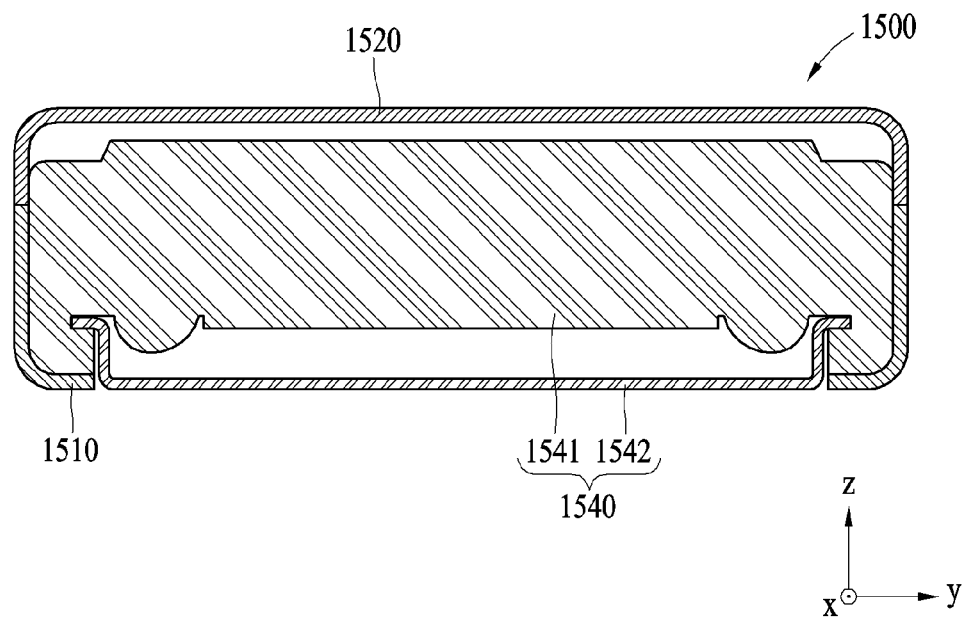
FIG. 15 is a cross-sectional view of a sound output module according to an embodiment of the disclosure.

FIG. 15 is a cross-sectional view of a sound output module according to an embodiment of the disclosure.

Referring to FIG. 15, in an embodiment of the disclosure, a sound output module 1500 may include a main housing 1510, a cover housing 1520, and a speaker 1540. The speaker 1540 may include a speaker body 1541 and a protective plate 1542. The speaker body 1541 may include a speaker head protruding in a −z direction to surround the protective plate 1542. The speaker head may be provided in surface contact with the main base 1510.

According to an embodiment of the disclosure, an electronic device including a speaker may include a main housing 310, a cover housing 320 connected to the main housing, a speaker 340 provided inside the main housing and the cover housing, and a guide 330 including a guide base 331 seated on the main housing to support the speaker and a guide body 332 extending from the guide base in a first direction and overlapping the speaker in a second direction perpendicular to the first direction.

In an embodiment of the disclosure, the main housing 310 may include a stainless-steel material.

In an embodiment of the disclosure, the guide body 332 may be in contact with the speaker.

In an embodiment of the disclosure, the speaker 340 may include a speaker body 341 of which at least a portion is provided inside the guide body, and a protective plate 342, of which at least a portion is provided inside the guide base, connected to the speaker body.

In an embodiment of the disclosure, the protective plate 342 may be spaced apart from the guide base in the second direction.

In an embodiment of the disclosure, the electronic device may further include a seal 750, 850 provided in a state of being compressed between the protective plate and the guide base.

In an embodiment of the disclosure, a first distance L1 from a bottom surface of the cover housing to the protective plate may be less than a second distance L2 from the bottom surface of the cover housing to the guide base.

In an embodiment of the disclosure, the electronic device may further include a seal 550, 650 provided in a state of being compressed between the speaker body and the guide body.

In an embodiment of the disclosure, at least a portion of the main housing 410 may be provided in a state of being inserted into the guide.

In an embodiment of the disclosure, the main housing 410 may include a main base 411 in contact with the guide base in the first direction, and a main body 412 extending from an outer edge of the main base to be in contact with the guide base and the guide body in the second direction.

In an embodiment of the disclosure, the main housing 410 may further include a main rib 413 extending from an inner edge of the main base and inserted into the guide.

In an embodiment of the disclosure, the main body 412 may be spaced apart from the guide in the second direction.

In an embodiment of the disclosure, at least a portion of the speaker 940 may be exposed to an outside the main housing and the cover housing.

In an embodiment of the disclosure, the electronic device may further include a plurality of porous capsules 1090 connected to the cover housing and accommodated in the main housing and the cover housing.

In an embodiment of the disclosure, the electronic device may further include a detachable cover 1070 detachably connected to the main housing.

According to an embodiment of the disclosure, an electronic device including a speaker may include a main housing 1210 including a main base and a main body extending from the main base, a cover housing 1220 connected to the main body, and a speaker 1240 including a speaker body 1241 provided inside the main housing and the cover housing and a protective plate 1242 of which at least a portion is exposed to an outside the main housing, connected to the speaker body.

In an embodiment of the disclosure, at least a portion of the speaker body 1241 may be exposed to an outside the cover housing.

In an embodiment of the disclosure, the main housing 1210 may be attached to the cover housing.

In an embodiment of the disclosure, the main housing may further include a first rib 1413 extending parallel to the main body from the main base and a second rib 1414 extending toward the main body from the first rib.

According to an embodiment of the disclosure, an electronic device including a speaker may include a main housing 310 including a stainless steel material, a cover housing 320 connected to the main housing and including a stainless steel material, a speaker 340 provided inside the main housing and the cover housing, and a guide 330 including a guide base seated on the main housing to support the speaker and a guide body extending from the guide base in a first direction and overlapping the speaker in a second direction perpendicular to the first direction, wherein the main housing may include a main base in contact with the guide base in the first direction and a main body extending from an outer edge of the main base to be in contact with the guide base and the guide body in the second direction.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a main housing;
    a cover housing connected to the main housing;
    a speaker provided inside the main housing and the cover housing; and
    a guide including a guide base and a guide body, the guide base being seated on the main housing to support the speaker and the guide body extending from the guide base in a first direction and overlapping the speaker in a second direction perpendicular to the first direction,
    wherein the speaker comprises:
        a speaker body of which at least a portion is provided inside the guide body; and
        a protective plate connected to the speaker body, at least a portion of the protective plate being provided inside the guide base, and
    wherein the protective plate is spaced apart from the guide base in the second direction.

2. The electronic device of claim 1, wherein the main housing comprises a stainless-steel material.

3. The electronic device of claim 1, wherein the guide body is in contact with the speaker.

4. The electronic device of claim 1, further comprising:
    a seal provided in a state of being compressed between the protective plate and the guide base.

5. The electronic device of claim 1, wherein a first distance from a bottom surface of the cover housing to the protective plate is less than a second distance from a bottom surface of the cover housing to the guide base.

6. The electronic device of claim 1, further comprising:
    a seal provided in a state of being compressed between the speaker body and the guide body.

7. An electronic device comprising:
    a main housing;
    a cover housing connected to the main housing;
    a speaker provided inside the main housing and the cover housing; and
    a guide comprising:
        a guide base seated on the main housing to support the speaker;
        a guide body extending from the guide base in a first direction and overlapping the speaker in a second direction perpendicular to the first direction; and
        a guide accommodating portion recessed on the guide base,
    wherein at least a portion of the main housing is accommodated in the guide accommodating portion of the guide.

8. The electronic device of claim 7,
    wherein the main housing includes a main body, a main base, and a main rib,
    wherein the main rib extends from an inner edge of the main base and includes a curved shape, and
    wherein the guide accommodating portion accommodates the main rib of the main housing.

9. The electronic device of claim 1, wherein the main housing comprises:
    a main base in contact with the guide base in the first direction; and
    a main body extending from an outer edge of the main base to be in contact with the guide base and the guide body in the second direction.

10. The electronic device of claim 9, wherein the main housing further comprises:
    a main rib extending from an inner edge of the main base and inserted into the guide.

11. The electronic device of claim 9, wherein the main body is spaced apart from the guide in the second direction.

12. The electronic device of claim 1, wherein at least a portion of the speaker is exposed to an outside of the main housing and the cover housing.

13. The electronic device of claim 1, further comprising:
    a plurality of porous capsules provided inside the main housing and the cover housing.

14. The electronic device of claim 1, further comprising:
    a detachable cover detachably connected to the main housing.

15. An electronic device comprising:
    a main housing comprising a main base and a main body extending from the main base;
    a cover housing connected to the main body; and
    a speaker comprising a speaker body and a protective plate connected to the speaker body, the speaker body being provided inside the main housing and the cover housing and at least a portion of the protective plate is exposed to an outside of the main housing,
    wherein the main housing further comprises:
        a first rib extending parallel to the main body from the main base; and
        a second rib extending toward the main body from the first rib.

16. The electronic device of claim 15, further comprising:
    a guide comprising a guide body extending from a guide base in a first direction and overlapping the speaker in a second direction perpendicular to the first direction.

17. The electronic device of claim 16, wherein at least a portion of the main housing is provided in a state of being inserted into the guide.

18. The electronic device of claim 15, wherein the main housing comprises a stainless-steel material.

19. The electronic device of claim 15, wherein at least a portion of the speaker body is exposed to an outside of the cover housing.

20. The electronic device of claim 15, wherein the main housing is attached to the cover housing.

21. An electronic device comprising:
    a main housing comprising a stainless-steel material;
    a cover housing connected to the main housing and comprising the stainless-steel material;
    a speaker provided inside the main housing and the cover housing; and
    a guide comprising a guide base and a guide body, the guide base being seated on the main housing to support the speaker and the guide body extending from the guide base in a first direction and overlapping the speaker in a second direction perpendicular to the first direction, wherein the main housing comprises:
- a main base in contact with the guide base in the first direction, and
- a main body extending from an outer edge of the main base to be in contact with the guide base and the guide body in the second direction, wherein the speaker comprises:
- a speaker body of which at least a portion is provided inside the guide body; and
- a protective plate connected to the speaker body, at least a portion of the protective plate being provided inside the guide base, and wherein the protective plate is spaced apart from the guide base in the second direction.

* * * * *